United States Patent [19]

Wren

[11] Patent Number: 4,832,667
[45] Date of Patent: May 23, 1989

[54] FRONT CHAIN WHEEL CHAIN GUIDE

[76] Inventor: Nicholas D. Wren, Rt. 3, Box 3625, Boerne, Tex. 78006

[21] Appl. No.: 82,119

[22] Filed: Aug. 6, 1987

[51] Int. Cl.$^4$ .............................................. F16H 7/18
[52] U.S. Cl. ..................................... 474/140; 474/144
[58] Field of Search .................. 474/140, 144–147, 474/151, 78–82; 74/608; 180/84; 280/160.1, 152 R, 152.1, 152.2, 159, 160

[56] References Cited

U.S. PATENT DOCUMENTS 4,237,743 12/1980 Nagano ............................ 474/140 X
4,639,240 1/1987 Liu ..................................... 474/144
4,699,539 10/1987 Chen ............................... 474/144 X Primary Examiner—Thuy M. Bui
Attorney, Agent, or Firm—Cox & Smith Incorporated

[57] ABSTRACT

An overshift preventer comprising a guard plate having a chain biasing region, a base member integral with the guard plate and adjustable horizontally adjacent the chain gears of a bicycle, and a clamp for supporting the base member and for mounting the guard plate to a bicycle seat tube perpendicularly in a spaced parallel relationship to the front chain gears.

3 Claims, 1 Drawing Sheet

FRONT CHAIN WHEEL CHAIN GUIDE

BACKGROUND OF THE INVENTION

The present invention relates to an overshift preventer to be mounted to the seat tube of a bicycle adjacent a front derailleur and chain wheels. Most full size bicycles sold in the United States are provided with derailleur gearing systems. These gearing systems typically consist of a front derailleur, a rear derailleur, control cables and shift levers. On a fifteen-speed or greater bike, one shift lever operates the front derailleur, permitting the chain to be forced from one of the three chain wheels to another. Rear derailleurs, provided on five speed and ten-speed bikes, shift a bicycle chain from one sprocket to another.

Problems sometimes are encountered when a chain is rapidly shifted from the largest chain wheel to the smallest chain wheel. Although rear derailleurs are provided with a spring-tensioned device to take up slack in the chain, frequently a chain may become derailed before the chain tension can be corrected. Further, the chain is more likely to derail completely when the chain is on the largest rear sprocket, because the innermost location of the large rear sprocket adjacent to the spokes tends to bias the chain inwardly. The primary cause of complete derailment is a lack of positive retention of the chain on the teeth of the sprockets, because the front derailleur guide plate is simply too far away from the sprockets to bias the chain securely onto the sprockets. When derailment occurs, the bicycle rider must coast to a stop, dismount, and re-rail the chain before continuing onward.

Front derailleurs customarily consist of a cage for guiding a chain, and a linkage mechanism for moving the cage horizontally for engaging the chain on different chain wheels. Wide-range gearing with triple chain wheels requires a particularly strong front derailleur cage. In most currently available front derailleurs the derailleur is spring biased toward the smallest, and innermost chain wheel. If the amount of travel of the front derailleur cage is not precisely adjusted using set-stop screws, and the chain either fails to engage the chain wheel properly or is shifted beyond the smallest chain wheel, then the chain becomes easily derailed.

It is an object of the present invention to provide a means for preventing the derailing of a bicycle chain adjacent a front derailleur in bicycles having wide gearing ranges (very high to very low), such as in most mountain bikes or tandem bicycles.

It is a further object of the present invention is to provide an apparatus which prevents a bicycle chain from jumping off of a larger chain wheel to a small chain wheel and failing to engage the small chain wheel.

Another object of the present invention is to provide an overshift preventer which prevents a bicycle chain from jumping off a small chain wheel due to chain bounce, which can occur in areas of rough terrain or can be caused by an object striking the drive train, or by a rapid shift.

Yet another object of the present invention is to provide a means for re-railing the derailed chain once pedalling is resumed if the chain becomes derailed from the bottom teeth of a gear, which can occur when the rider is back-pedalling or when the bike is transported on its side.

These and other objects, features and advantages of the present invention will become evident in light of the following detailed description.

SUMMARY OF THE INVENTION

These objects and advantages are accomplished by providing a front wheel chain wheel guide comprising (1) a guard plate having a chain biasing region coming into contact with and biasing a driving chain when the chain is switched from a larger diameter front chain gear to a smaller diameter front chain gear mounted on a crankset of a bicycle, (2) a base member integral with the guard plate and slidably adjustable horizontally adjacent the chain gears, and (3) mounting means for supporting the base member and for mounting the guard plate perpendicularly in a spaced parallel relationship to the front chain gears.

DETAILED DESCRIPTION OF THE PREFERRED EMBODIMENT

Figure 1:
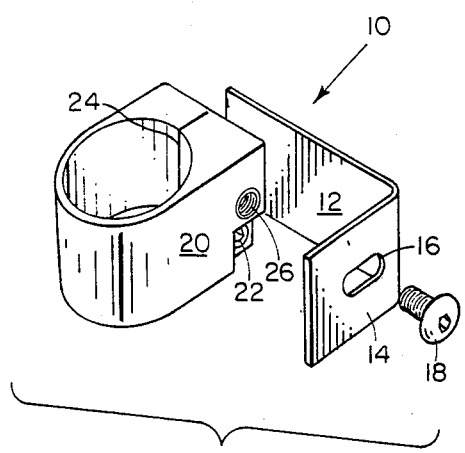
FIG. 1 is an exploded perspective view of an apparatus constructed according to the teachings of the present invention.

A presently preferred embodiment of an apparatus for preventing derailing and promoting re-railing of a bicycle driving chain as it shifts from one gear to another of a multistage chain gear assembly according to the present invention is designated generally at reference numeral 10 in FIG. 1. The apparatus 10 for preventing derailing of a chain from a gear is comprised of a guard plate 12 having base member 14 provided with an elongate slot 16 therein. A bolt 18 is received therethrough for mounting guard plate 12 to a mounting means 20.

Mounting means 20 is constructed having a first threaded insert 22 slidably received therethrough for adjustment of opposed adjacent end portions 24 in close proximity to one another. Bolt 18 is threadably received within a second threaded insert 26 for mounting base member 14 of guard plate 12 to mounting means 20. A single bolt and threaded insert can be used to both clamp the mounting means 20 to the frame and secure the guard plate 12 to the mounting means 20, as is known in the art. In a presently preferred embodiment of the invention, guard plate 12 is constructed of stainless steel, and mounting means 20 is a standardly available bicycle seat-tube clamp made of plastic, such as those available from "Rhode Gear" and described in U.S. Pat. No. 4,185,850.

Figure 2:
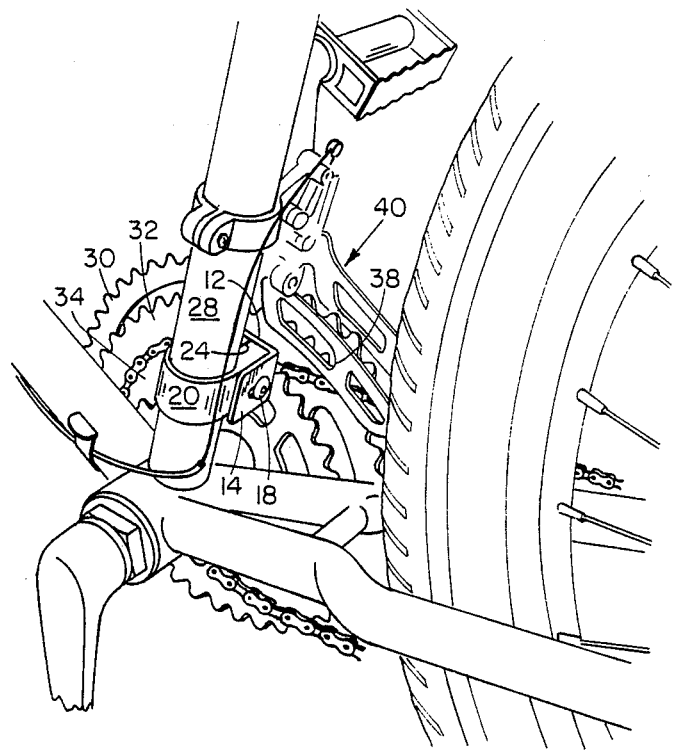
FIG. 2 is a perspective view of the apparatus of FIG. 1 as it appears when mounted to a seat tube adjacent portions of the front chain gear and frame.

FIG. 2 shows in an elevational view the overshift preventer of the present invention as it appears mounted to a bicycle seat tube 28 with the guard plate 12 positioned substantially parallel to gears 30, 32, and 34. Chain 36 is shown engaged on the teeth of the smallest gear 34. Chain 36 passes through the cage 38 of front derailleur 40. Guard plate 12 is slidably adjustable within elongate slot 16 of base plate 14 adjacent chain 36 and gear 34.

Figure 3:
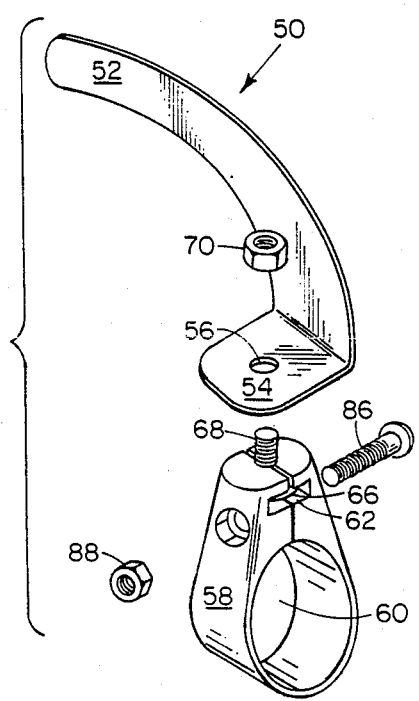
FIG. 3 is an exploded perspective view of an alternate embodiment of an apparatus constructed according to the teachings of the present invention.
Figure 4:
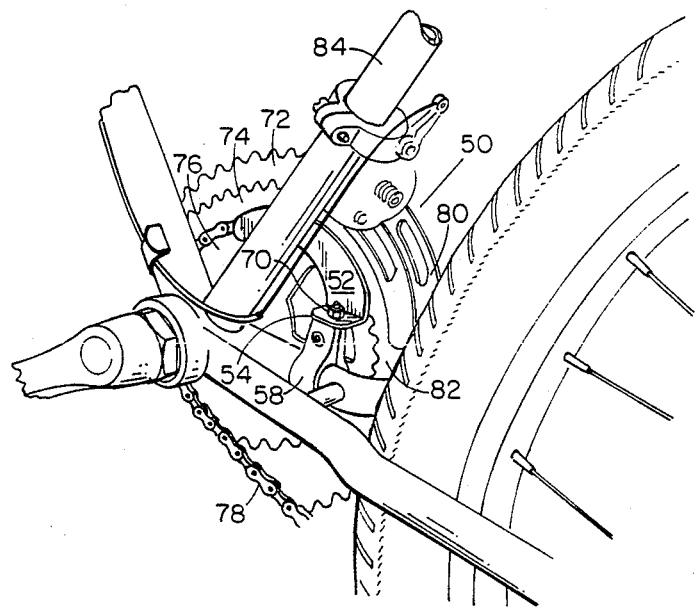
FIG. 4 is a perspective view of the apparatus of FIG. 3, as it appears when mounted to a frame member adjacent portions of the front chain gear and frame.

Referring to FIGS. 3 and 4, an alternate embodiment of an apparatus constructed according to the teachings of the present invention is shown designated generally at 50. Guardplate 52 is generally arcuate in configuration. Guard plate 52 is provided with a base member 54, having a slot 56 received therein.

Mounting means 58 is provided with a generally elliptical opening 60, an aperture 62, and opposed adjacent end portions 64 in mounting means 58. A head 66 of a first bolt 68 is slidably received within aperture 62, then slidably received through slot 56 and threadably received within nut 70 for mounting base member 54 of guard plate 52 to mounting means 58.

Referring to FIG. 4, the apparatus of FIG. 3 is shown as it appears when mounted to a frame member adjacent to gears 72, 74, and 76 and chain 78 engaged upon the teeth of smallest gear 76. The guard plate 52 is mounted well below the derailleur to the frame tube of the bicycle in close proximity to gear 76 and chain 78, so that any shifting of derailleur 80 from the outer, larger gear 76 past the smaller gear 74 and toward the smallest gear 72 will cause guard plate 52 to bias chain 78 towards gear.

To use the present invention, mounting means 20 is slipped around seat tube 28 by opening mounting means 20 at opposed adjacent end portions 24 sufficiently to permit engagement of elliptical opening 25 around seat tube 28. In a presently preferred embodiment, the opening 25 is circular, to fit a circular seat tube 28. The opening 25 of apparatus can also be elliptical to fit an elliptical seat tube. Threaded inserts 22 and 26 are slidably inserted within holes 23 and 27 of mounting means 20. Base member 14 of guard plate 12 is then secured to mounting means 20 by means of bolt 18 threadably received within threaded insert 16. Slot 16 of base member 14 is slidably adjusted about bolt 18 for close alignment of guard plate 12 adjacent gears 30, 34, and 36 and chain 38.

To use the alternate embodiment of the present invention, mounting means 58 is opened at opposed adjacent end portions 64 and slipped around frame member 82 adjacent gears 72, 74 and 76 and seat tube 84. Bolt 86 is inserted in hole 87, and nut 88 is then screwed on bolt 86 to bolt mounting means 58 in firm engagement with frame member 82. Next head 66 of bolt 88 is slipped within aperture 62, and slot 56 of base member 54 is slipped onto bolt 68. Finally, nut 70 is tightened to secure base member 54 of guard plate 52 firmly adjacent mounting means 58. Adjustment of the angle and proximity of guard plate 52 adjacent gears 72, 74, 76 and chain 78 are contemplated.

Although the invention has been described in conjunction with the foregoing specific embodiment, other alternatives, variations, and modifications shall be apparent to those of ordinary skill in the art. Those alternatives, variations and modifications are intended to fall within the spirit and scope of the appended claims.

I claim:

1. A front chain wheel chain guide for preventing the inward derailment of a driving chain from the inner gear of a multistage gear assembly, comprising:

a planar guard plate; and, means for slidably mounting the guard plate adjacent and in a plane parallel to the inner gear thereby permitting inward and outward adjustment of the guard plate's position relative to the inner gear while maintaining the guard plate in the same plane as the inner gear.

2. The chain guide of claim 1 wherein the guard plate mounting means comprises a clamp for encircling a bicycle frame tube and wherein the guard plate comprises a base member having a slot therethrough for slidably mounting the guard plate to the clamp with a bolt.

3. The chain guide of claim 2 wherein the guard plate is of generally arcuate shape.

* * * * *